United States Patent
Fingleton et al.

(10) Patent No.: US 9,236,824 B2
(45) Date of Patent: Jan. 12, 2016

(54) SYSTEM AND METHOD FOR CONTROLLING AN ELECTRIC MOTOR

(71) Applicant: Solar Turbines Incorporated, San Diego, CA (US)

(72) Inventors: Daniel Fingleton, San Diego, CA (US); Ryan Elliott Bergener, Escondido, CA (US); Thayer Barakat, Carlsbad, CA (US)

(73) Assignee: Solar Turbines Incorporated, San Diego, CA (US)

( * ) Notice: Subject to any disclaimer, the term of this patent is extended or adjusted under 35 U.S.C. 154(b) by 225 days.

(21) Appl. No.: 13/650,765

(22) Filed: Oct. 12, 2012

(65) Prior Publication Data

US 2014/0103846 A1   Apr. 17, 2014

(51) Int. Cl.
*H02P 7/00* (2006.01)
*H02K 17/42* (2006.01)
*H02P 23/00* (2006.01)

(52) U.S. Cl.
CPC ................... *H02P 23/0068* (2013.01)

(58) Field of Classification Search
CPC ........................................... H02P 7/00
USPC ........................ 318/777; 180/65.51
See application file for complete search history.

(56) References Cited

U.S. PATENT DOCUMENTS

| | | | | |
|---|---|---|---|---|
| 3,854,077 A | * | 12/1974 | Greenwell | 318/808 |
| 5,030,898 A | * | 7/1991 | Hokanson et al. | 318/146 |
| 5,123,080 A | * | 6/1992 | Gillett et al. | 388/811 |
| 5,378,952 A | * | 1/1995 | Schaffersmann | 310/68 R |
| 2004/0217668 A1 | * | 11/2004 | Antonopoulos et al. | 310/168 |
| 2008/0265828 A1 | * | 10/2008 | Ganev et al. | 318/777 |
| 2009/0243522 A1 | * | 10/2009 | Suhama et al. | 318/376 |
| 2011/0138826 A1 | * | 6/2011 | Lifson et al. | 62/115 |
| 2011/0284300 A1 | * | 11/2011 | Cheng et al. | 180/65.51 |
| 2011/0291596 A1 | * | 12/2011 | Lu et al. | 318/400.09 |

* cited by examiner

*Primary Examiner* — Paul Ip
*Assistant Examiner* — Devon Joseph
(74) *Attorney, Agent, or Firm* — Finnegan, Henderson, Farabow, Garrett & Dunner, LLP

(57) ABSTRACT

A system for controlling an electric motor is disclosed herein. In particular, the system receives a user input indicative of a desired performance parameter for the electric motor. Based on the desired performance parameter, the system determines a control parameter that defines an operational range. The system then adjusts the electric motor according to the control parameter so that the electric motor generates constant output power over the operational range.

17 Claims, 4 Drawing Sheets

SYSTEM AND METHOD FOR CONTROLLING AN ELECTRIC MOTOR

TECHNICAL FIELD

The present disclosure is directed to an electric motor and, more particularly, to a system and method for controlling an electric motor.

BACKGROUND

Electric motors are widely used to drive mechanical systems in industrial applications. A motor system usually includes a controller for controlling operation of the electric motor. The controller adjusts the operation, such as speed, torque, and power, of the electric motor based on many control parameters. In many applications, it is desired to operate the electric motor to provide constant output power in a variety of operational conditions.

U.S. Pat. No. 5,123,080 discloses a constant torque electric motor for driving an air conditioner compressor. The motor receives a power frequency and a power voltage as inputs and provides a constant torque within a frequency range of 6 to 60 Hz. From 60 Hz to 90 Hz, the power voltage input to the constant torque motor is constant at 230 V, resulting in the motor producing a constant horsepower output over this power frequency range. By varying the power frequency and the power voltage simultaneously, the motor speed becomes controllable resulting in the control of the air conditioner compressor and corresponding cooling capability of the system.

In conventional, electric motor control systems, however, there are problems that adjustments of motor operations are inflexible. In addition, it is difficult to maintain output power of an electric motor when a rotational speed of the electric motor varies significantly. The system of the present disclosure is directed to improving upon existing technologies.

SUMMARY

In some embodiments, a method for controlling an electric motor is disclosed. The method comprises receiving a user input indicative of a desired performance parameter for the electric motor and determining a control parameter based on the desired performance parameter. The control parameter defines an operational range. The method further comprises adjusting the electric motor according to the control parameter to generate constant output power over the operational range.

In some alternative embodiments, an electric motor control system is disclosed. The system comprises an electric motor, a power source, and a controller. The power source provides an electric power signal. The controller converts the electric power signal to a control signal to drive the electric motor. The control signal includes a control parameter. The controller receives a user input indicative of a desired performance parameter for the electric motor and determines the control parameter based on the desired performance parameters. The control parameter defines an operational range. The controller further adjusts the electric motor according to the control parameter to generate constant output power over the operational range.

In still other alternative embodiments, an electric motor control system is disclosed. The system comprises an electric motor, a power source, and a controller. The power source provides an electric power signal. The controller converts the electric power signal to a control signal to drive the electric motor. The control signal includes a control parameter. The controller receives a user input indicative of a desired performance parameter for the electric motor. Output power of the electric motor and a rotational speed of the electric motor are represented with a known functional relationship. The controller then determines the control parameter based on the known functional relationship and the desired performance parameters. The control parameter defines an operational range. The controller then adjusts the electric motor according to the control parameter to generate constant output power over the operational range.

DETAILED DESCRIPTION

Figure 1:
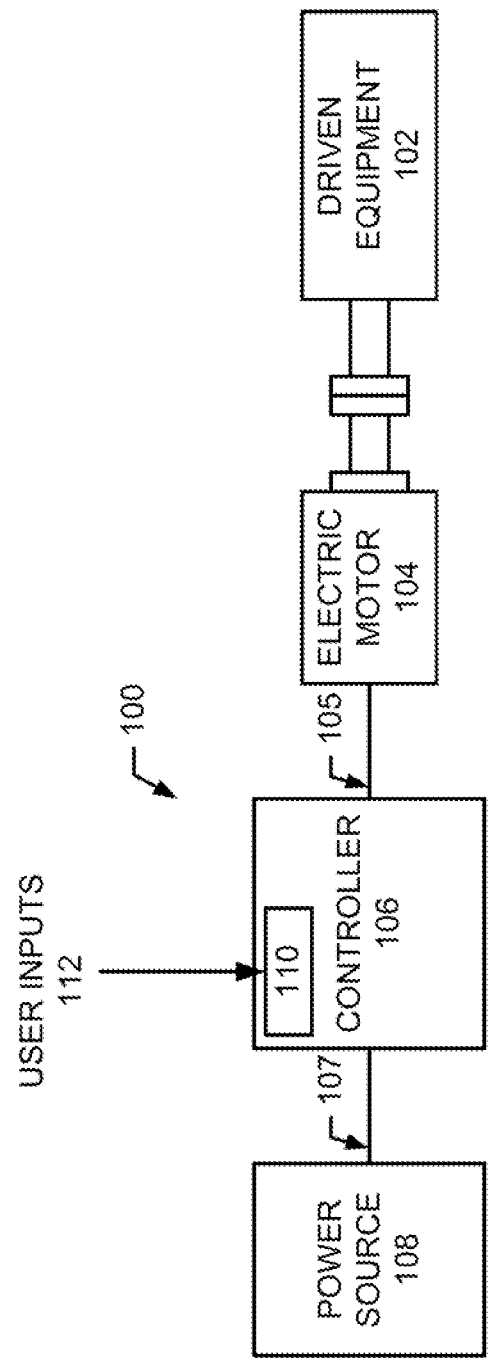
FIG. 1 is a diagram of an exemplary disclosed control system.

FIG. 1 illustrates an exemplary disclosed electric motor control system 100. Control system 100 includes an electric motor 104 coupled to a driven equipment 102. Electric motor 104 provides rotational power to driven equipment 102 through a coupling therebetween. Driven equipment 102 may be a pump, a compressor, a generator, or any other equipment that draws rotational power from electric motor 104.

Electric motor 104 may be an asynchronous motor (e.g., an induction motor), a synchronous motor, an AC motor, a DC motor, or any other type of electric motor known in the art. A rotational speed of electric motor 104 may be adjusted continuously within a range between a minimum speed and a maximum speed. An output torque and an output power of electric motor 104 may be adjusted in connection with the rotational speed. In a further embodiment, motor 104 may be a large scale, high power motor capable of producing maximum power over, for example, 2,000 horsepower. Motor 104 may receive input voltage in a range of 3,000 to 7,000 volts. As a result, it is preferable to operate motor 104 in a low speed range.

Additionally, a rotational speed and an output power of electric motor 104 may be controlled according to requirements or characteristics of driven equipment 102. For example, driven equipment 102 may require low input power at a low speed and high input power at a high speed. Accordingly, the output power of electric motor 104 may be increased or decreased as the rotational speed increases or decreases. Alternatively, driven equipment 102 may require a substantially constant input power within a given range of the rotational speed. Accordingly, the output power of electric motor 104 may be set to a constant value within the given speed range.

Control system 100 further includes a controller 106 suitable for controlling electric motor 104, and a power source 108 for providing an electric power signal 107 to controller 106. Depending on a configuration of electric motor 104, controller 106 may be a DC controller or an AC controller, and power source 108 may be a DC source or an AC source. For example, when electric motor 104 is an induction motor, power source 108 may be a three-phase AC power source for providing the electric power signal 107 at a predetermined voltage level and a predetermined frequency, such as about 60 Hz. Accordingly, controller 106 may be a power electronic device, which controls electric motor 104 by converting the input AC power signal 107 from power source 108 to a control signal 105 with a variable voltage level and a variable frequency. Controller 106 may then control the rotational speed and power of electric motor 104 according to the control signal 105.

According to a further embodiment, the rotational speed of motor 104 is related to the frequency of control signal 105. Hence, continuous speed control of motor 104 over a range may be realized by continuously varying the frequency of control signal 105. The frequency of control signal 105 and the speed of motor 104 may have a generally linear relationship, in which a higher frequency of control signal 105 corresponds to a higher speed of motor 104, and a lower frequency of control signal 105 corresponds to a lower speed of motor 104. For example, a 30 Hz frequency in control signal 105 may correspond to the speed of motor 104 at about 3000 rpm, and a 60 Hz frequency in control signal 105 may correspond to the speed of the motor 104 at about 6000 rpm.

According to another embodiment, the speed control of motor 104 may be specified as a percentage of a user-defined speed. The user-defined speed may be defined by a user of motor 104 to achieve a given performance in a specific application. As such, the frequency of control signal 105 may be used to set the speed of motor 104 to a percentage of the user-defined speed. For example, a 30 Hz frequency in control signal 105 may correspond to about 60% of the user-defined speed, whereas a 60 Hz frequency in control signal 105 may correspond to about 90% of the user-defined speed.

Figure 2:
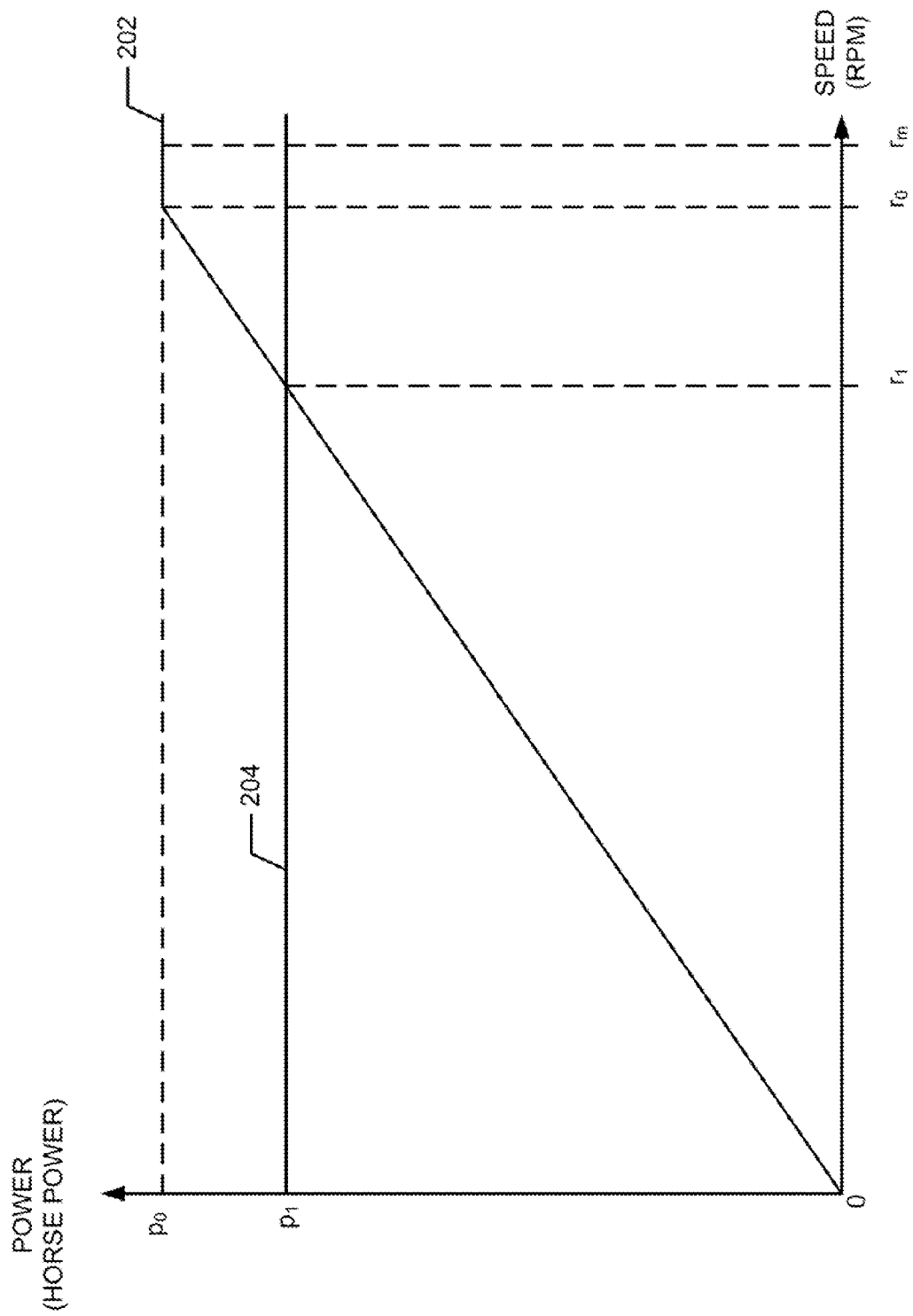
FIG. 2 is a graph illustrating an exemplary control relationship used by the motor control system of FIG. 1.

According to a still further embodiment, controller 106 controls the output power of motor 104 as a function of the rotational speed of motor 104. As shown in FIG. 2, for example, controller 106 may control the output power of motor 104 according to a functional relationship between the output power and the rotational speed of motor 104. The functional relationship between the output power and the rotational speed of motor 104 may be represented by a power-speed curve 202. According to power-speed curve 202, controller 106 may adjust the output power of motor 104 when the rotational speed changes. According to a further embodiment, the output power and the rotational speed of motor 104 may have a linear or non-linear functional relationship.

According to power-speed curve 202, motor 104 has a maximum rotational speed which is set according to, for example, a mechanical limit of motor 104. The maximum rotational speed $r_m$ corresponds to a maximum frequency of control signal 105 according to the relationship between the speed of motor 104 and the frequency of control signal 105. By varying the frequency of control signal 105, controller 106 may continuously adjust the rotational speed of motor 104 between zero and the maximum speed $r_m$. Furthermore, when the rotational speed is between the range of zero and $r_0$, controller 106 may increase or decrease the output power of motor 104 as the rotational speed increases or decreases. When the rotational speed is greater than $r_0$, controller 106 may maintain the output power at a predetermined maximum power $p_0$. As a result, motor 104 produces constant power between speed $r_0$ and the maximum speed $r_m$. Since the output power of motor 104 stops increasing at speed $r_0$, speed $r_0$ is defined as a "corner speed," and the frequency of control signal 105 corresponding to speed $r_0$ is defined as a "corner frequency."

According to a still further embodiment, controller 106 may adjust the corner speed $r_0$ and the corresponding corner frequency. As further shown in FIG. 2, for example, controller 106 may adjust the corner frequency and the corner speed by adjusting the maximum output power of motor 104. Specifically, controller 106 may decrease the corner speed by decreasing the maximum output power. For example, controller 106 may reduce the maximum output power of motor 104 from $p_0$ to $p_1$. As shown in FIG. 2, an interception between a horizontal power curve 204, corresponding to new maximum power $p_1$, and power-speed curve 202 provides a new corner speed $r_1$. As a result, when the rotational speed of motor 104 is between zero and $r_1$, controller 106 increases or decreases the output power of motor 104 as the rotational speed increases or decreases. When the rotational speed of motor 104 increases beyond new corner speed $r_1$, the output power of motor 104 remains at the new maximum power $p_1$. As a result, the corner speed of motor 104 is adjusted from the original corner speed $r_0$ to the new corner speed $r_1$, and motor 104 produces constant power over the speed range between $r_1$ and $r_m$. Because the new corner speed $r_1$ is less than the original corner speed $r_0$, the speed range, over which the output power of motor 104 remains constant, is increased. Thus, the frequency range between the new corner frequency and the maximum frequency is also increased.

According to a still further embodiment, controller 106 includes an interface 110 as According shown in FIG. 1 for receiving user inputs 112 that adjust control parameters of motor 104, such as the corner speed, the corner frequency, and/or the maximum output power. Interface 110 may be a keypad, a keyboard, or a touch screen for a user to input a new control parameter. For example, when the user inputs a new corner frequency through interface 110 controller 106 may determine the new corner speed, such as $r_1$, corresponding to the new corner frequency according to the relationship between the rotational speed and the frequency of signal 105. Based on power-speed curves 202, controller 106 may further determine the maximum power, such as $p_1$, corresponding to the new corner speed $r_1$. As such, controller 106 operates motor 104 according to the power-speed curve 202 when the rotational speed is below the new corner speed $r_1$ and maintains the output power at the maximum power $p_1$ when the rotational speed varies between the new corner speed $r_1$ and the maximum speed $r_m$.

Alternatively or additionally, the user may enter the maximum output power $p_1$ as desired through interface 110. Based on power-speed curve 202, controller 106 may determine the new corner speed $r_1$ corresponding to the maximum output power $p_1$ and the new corner frequency corresponding to the new corner speed $r_1$. Controller 106 may increase the corner speed and the corner frequency when the maximum constant power $p_1$ is increased, thereby decreasing the frequency range over which motor 104 may produce constant power. Alternatively, controller 106 may decrease the corner frequency when the maximum constant power $p_1$ is decreased, thereby increasing the frequency range over which motor 104 may produce constant power.

According to a further embodiment, the maximum frequency corresponding to the maximum speed $r_m$ may be in the range of about 63-65 Hz, the corner frequency corresponding to the original corner speed $r_0$ may be substantially equal to 60 Hz, and the new corner frequency corresponding to the new corner speed $r_1$ may be less than about 50 Hz. For example, controller 106 may adjust the corner frequency from 60 Hz to 45 Hz and control motor 104 to generate constant output power between 45 Hz and 65 Hz. Other frequency ranges may also be used as desired.

Alternatively or additionally, controller 106 may control motor 104 to produce constant output power in terms of a speed range. For example, controller 106 may set the new corner speed to 3000 rpm and control motor 104 to produce constant power between 3000 rpm and a maximum speed, e.g., 6000 rpm. Still alternatively, controller 106 may control motor 104 to produce constant output power in terms of a percentage of the predicted speed. For example, controller 106 may set the new corner speed to 60% of the predicted speed and control motor 104 to produce constant power between 60% and 105% of the predicted speed. One skilled in the art would recognize that other configurations of the motor 104 are within the scope of the disclosure.

Figure 3:
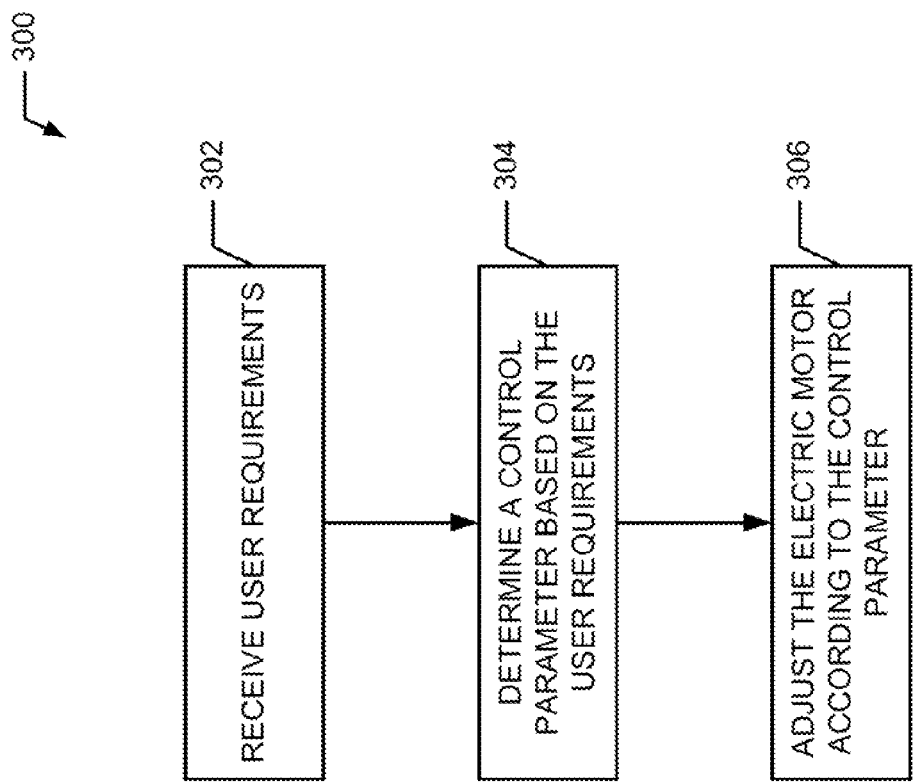
FIG. 3 is a flowchart illustrating an exemplary process performed by the motor control system.

FIG. 3 depicts an exemplary disclosed process 300 for controlling motor 104. According to process 300, at step 302, controller 106 receives user requirements through user inputs 110 indicative of a desired performance parameter including, for example, the maximum power desired from motor 104 or an operational range (e.g., a speed range or a frequency range) over which constant power output by motor 104 is desired.

At step 304, controller 106 may determine a control parameter based on the desired performance parameter. For example, when the user specifies a speed range between, for example, $r_1$ and $r_m$ as shown in FIG. 2, controller 106 may determine a corner frequency corresponding to corner speed $r_1$ based on the relationship between the rotational speed and the control frequency of motor 104. Alternatively, when the user specifies the maximum output power $p_1$ desired from motor 104. controller 106 may first determine the corner speed $r_1$ according to power-speed curve 202, and then determine the corner frequency corresponding to the corner speed $r_1$. Still alternatively, when the user specifies a new corner frequency, controller 106 may determine a corner speed corresponding to the new corner frequency according to the relationship between the rotational speed and the control frequency. Controller 106 may then further determine the maximum power corresponding to the corner speed based on power-speed curve 202 of FIG. 2.

At step 306, controller 106 adjusts electric motor 104 according to the control parameter determined at step 304, such as the corner frequency, the corner speed, or the maximum output power. In particular, the control parameter defines an operational range of electric motor 104, such as the speed range between the corner speed $r_1$ and the maximum speed $r_m$ or the frequency range between the corner frequency and the maximum frequency, over which motor 104 generates constant output power. As a result, controller 106 operates motor 104 to generate constant output power $p_1$ when the motor operates within the operational range defined by the control parameter. The operational range may be the speed range between the corner speed $r_1$ and the maximum speed $r_m$ or the frequency range between the corner frequency and the maximum frequency.

Alternatively or additionally, controller 106 controls motor 104 according to the power-speed curve 202 when the motor operates outside of the operational range defined by the control parameter, for example, below the corner speed $r_1$ or the corner frequency. Outside of the operational range, the output power of motor 104 varies according to power-speed curve 202. For example, when the speed or the control frequency increases or decreases, the output power of motor 104 increases or decreases accordingly.

Industrial Applicability

The above-disclosed motor control system, while being described for use in connection with an induction motor, can be used generally in alternative applications and environments, for example, in which a constant output power is desired over a large range of motor speed.

Figure 4:
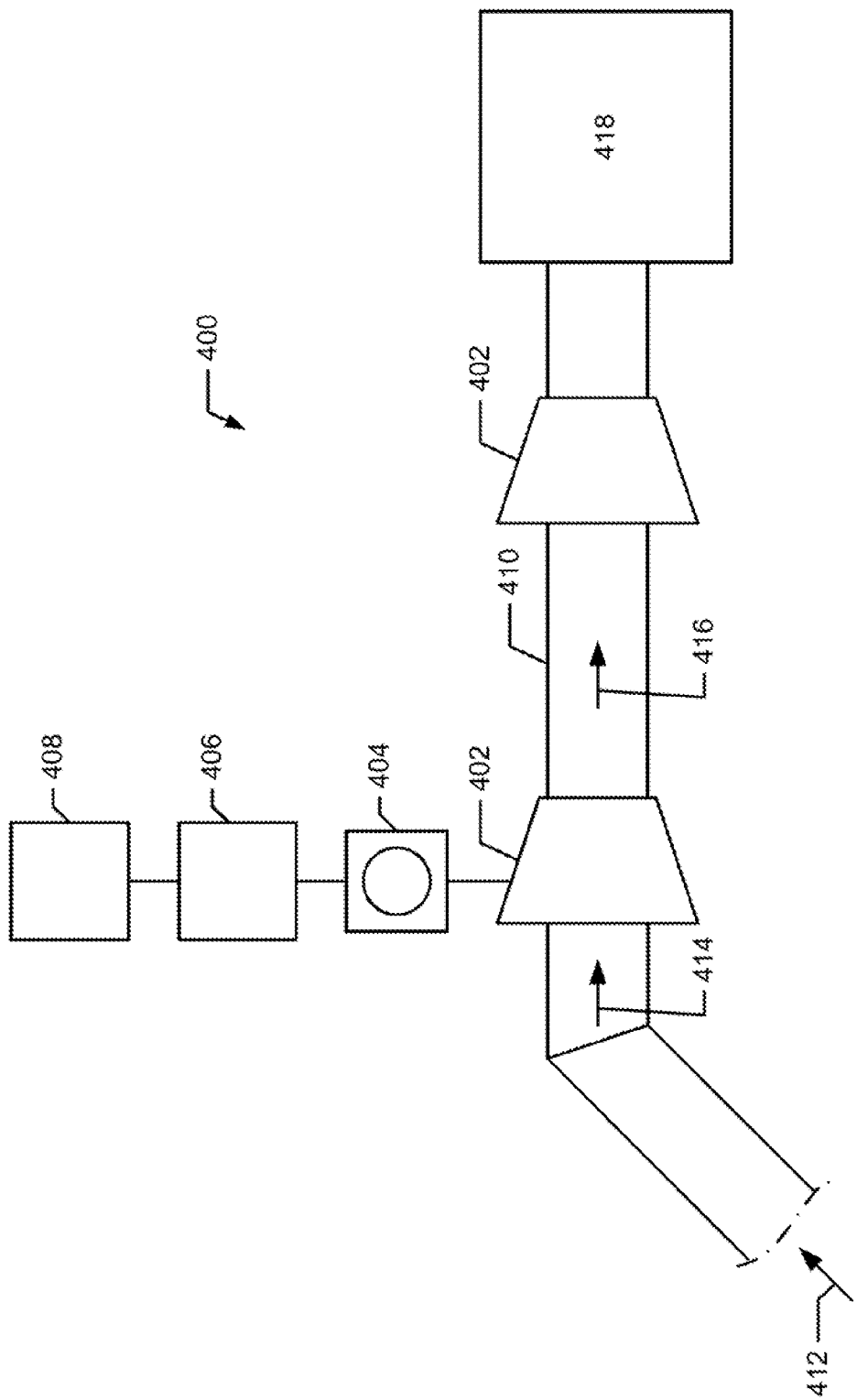
FIG. 4 is a diagram illustrating an exemplary disclosed gas/fluid transportation system using the motor control system of FIG. 1.

FIG. 4 depicts a gas/fluid transportation system 400 based on the electric motor system of FIG. 1. Specifically, system 400 may include a gas/fluid transportation pipeline 410 connecting a source of the gas/fluid 412, such as an underwater drilling site, and an off-site processing center 418 for processing and storing the gas/fluid.

System 400 may further include one or more compressors 402 connected to pipeline 410 for moving the gas/fluid along pipeline 410 from source 412 to off-site processing center 418. Compressors 402 may be disposed at various intervals between, for example, 1 to 15 miles. Each compressor 402 is driven by a motor system and generally corresponds to driven equipment 102 depicted in FIG. 1. Each compressor 402 receives an incoming gas/fluid flow 414, compresses it, and generates a high-pressure output flow 416, thereby moving the gas/fluid towards the next compressor 402 or towards off-site processing center 418. By adding pressure along transportation pipeline 410 at the predetermine intervals, system 400 is capable of transporting the gas/fluid 412 over a great distance.

The motor system of FIG. 4 further includes an electric motor 404, a controller 406, and a power source 408, generally corresponding to the components depicted in FIG. 1. In the gas/fluid transportation system of FIG. 4, it is desired to operate the electric motor driven compressor 402 at a constant power level over a wide range of operational conditions, such as a large speed range. Controller 406, similar to controller 106, may receive user requirements including the desired speed range for producing the constant power and determine a corner frequency based on the user requirements as discussed above in connection with FIG. 3. The corner frequency defines a frequency range, over which electric motor 404 produces constant power. As a result, system 400 provides flexibility for the operator to adjust the power level and speed range of the compressor 402 for moving the gas/fluid along pipeline 410.

For example, in transporting natural gas, compressor 402, driven by electric motor 404, may provide constant power over a larger speed range for moving the natural gas, compared with conventional natural gas transportation systems. This is particularly beneficial in applications that require constant power within a low speed range. System 400 allows the operator to change the maximum power output and the corresponding speed range of motor 404, as described above in connection with FIG. 3. As a result, motor 404 may provide constant power output even when the compressor operates at a low speed. In addition, the system 400 may provide desired performance. Over a large range of operating conditions including, for example, different incoming gas pressures, output gas pressures, types of gas, and flow rates. Reducing the corner frequency provides a larger frequency range over which motor 404 may operate at the constant power level, thereby covering a wide range of operational conditions. In addition, system 400 allows the operator to choose a relatively small motor size for motor 404 to drive compressor 402, thereby reducing costs and the overall size of the system.

It will be apparent to those skilled in the art that various modifications and variations can be made to the disclosed systems. Others embodiments will be apparent to those skilled in the art from consideration of the specification and practice of the disclosed systems. It is intended that the specification and examples be considered as exemplary only, with a true scope being indicated by the following claims and their equivalents.

What is claimed is:

1. A method for controlling an electric motor, comprising:
receiving a user input at a controller, wherein the user input is indicative of a desired speed range for the electric motor for producing a substantially constant output power by the electric motor, the desired speed range being defined by a first speed value and a second speed value;

determining a control parameter, using the controller, based on the desired speed range, the control parameter including a frequency value representing an operational range of the electric motor corresponding to the desired speed range, wherein the frequency value indicates a corner frequency corresponding to a corner speed, and wherein the desired speed range for the electric motor for producing a substantially constant output power is from the corner speed to a maximum speed of the electric motor;

determining the control parameter includes determining the corner speed corresponding to the substantially constant output power according to the functional relationship between the output power and the rotational speed;

the corner frequency defines a frequency range from the corner frequency to a maximum frequency for the electric motor; and the electric motor generates the substantially constant output power over the frequency range and within the desired speed range between the first speed value and the second speed value.

2. The method of claim 1, further including:
receiving an input signal from a power source configured to power the electric motor;
converting the input signal to a control signal; and
driving the electric motor with the control signal.

3. The method of claim 2, wherein:
the control signal includes a variable frequency; and
the method further includes adjusting a rotational speed of the electric motor according to the variable frequency.

4. The method of claim 3, wherein determining the control parameter includes representing output power of the electric motor and the rotational speed of the electric motor with a known functional relationship.

5. The method of claim 1, wherein:
the corner frequency is less than about 55 Hz; and
the maximum frequency is between about 60 and 65 Hz.

6. The method of claim 1, wherein adjusting the electric motor includes adjusting the frequency range.

7. The method of claim 6, wherein adjusting the frequency range includes increasing the frequency range.

8. The method of claim 6, wherein adjusting the frequency range includes decreasing the frequency range.

9. An electric motor control system, comprising:
an electric motor;
a power source configured to provide an electric power signal; and
a controller configured to:
convert the electric power signal to a control signal to drive the electric motor, the control signal including a control parameter;
receive a user input indicative of a desired speed range for the electric motor for producing a substantially constant output power, the desired speed range being defined by a first speed value and a second speed value;
determine the control parameter based on the desired speed range, the control parameter including a frequency value representing an operational range of the electric motor corresponding to the desired speed range, wherein the frequency value indicates a corner frequency corresponding to a corner speed, wherein the desired speed range for the electric motor for producing a substantially constant output power is from the corner speed to a maximum speed of the electric motor, and wherein the corner frequency defines a frequency range from the corner frequency to a maximum frequency for the electric motor; and
adjust the electric motor according to the control parameter to generate the substantially constant output power within the desired speed range between the first speed value and the second speed value.

10. The system of claim 9, wherein:
the control signal includes a variable frequency; and
the controller is further configured to adjust a rotational speed of the electric motor according to the variable frequency.

11. The system of claim 10, wherein the controller is further configured to represent output power of the electric motor and the rotational speed of the electric motor with a known functional relationship.

12. The system of claim 11, wherein:
the controller is further configured to determine the corner speed corresponding to the substantially constant output power according to the functional relationship between the output power and the rotational speed, wherein the functional relationship is a generally linear relationship.

13. The system of claim 9, wherein
the electric motor generates the substantially constant output power over the frequency range.

14. The system of claim 13, wherein:
the corner frequency is less than about 55 Hz; and
the maximum frequency is between about 60 and 65 Hz.

15. The system of claim 13, wherein the controller is further configured to adjust the frequency range.

16. The system of claim 15, wherein the controller is further configured to increase the frequency range.

17. An electric motor control system, comprising:
an electric motor;
a power source configured to provide an electric power signal; and
a controller configured to:
convert the electric power signal to a control signal to drive the electric motor, the control signal including a control parameter;
receive a user input indicative of a desired speed range for the electric motor for producing a substantially constant output power, the desired speed range being defined by a first speed value and a second speed value;
represent output power of the electric motor and a rotational speed of the electric motor with a known functional relationship;
determine the control parameter based on the known functional relationship and the desired speed range, the control parameter including a frequency value representing an operational range of the electric motor corresponding to the desired speed range, wherein the frequency value indicates a corner frequency corresponding to a corner speed, wherein the desired speed range for the electric motor for producing a substantially constant output power is from the corner speed to a maximum speed of the electric motor, and wherein the corner frequency defines a frequency range from the corner frequency to a maximum frequency for the electric motor; and
adjust the electric motor according to the control parameter to generate the substantially constant output power within the desired speed range between the first speed value and the second speed value.

* * * * *